Patented Dec. 1, 1953

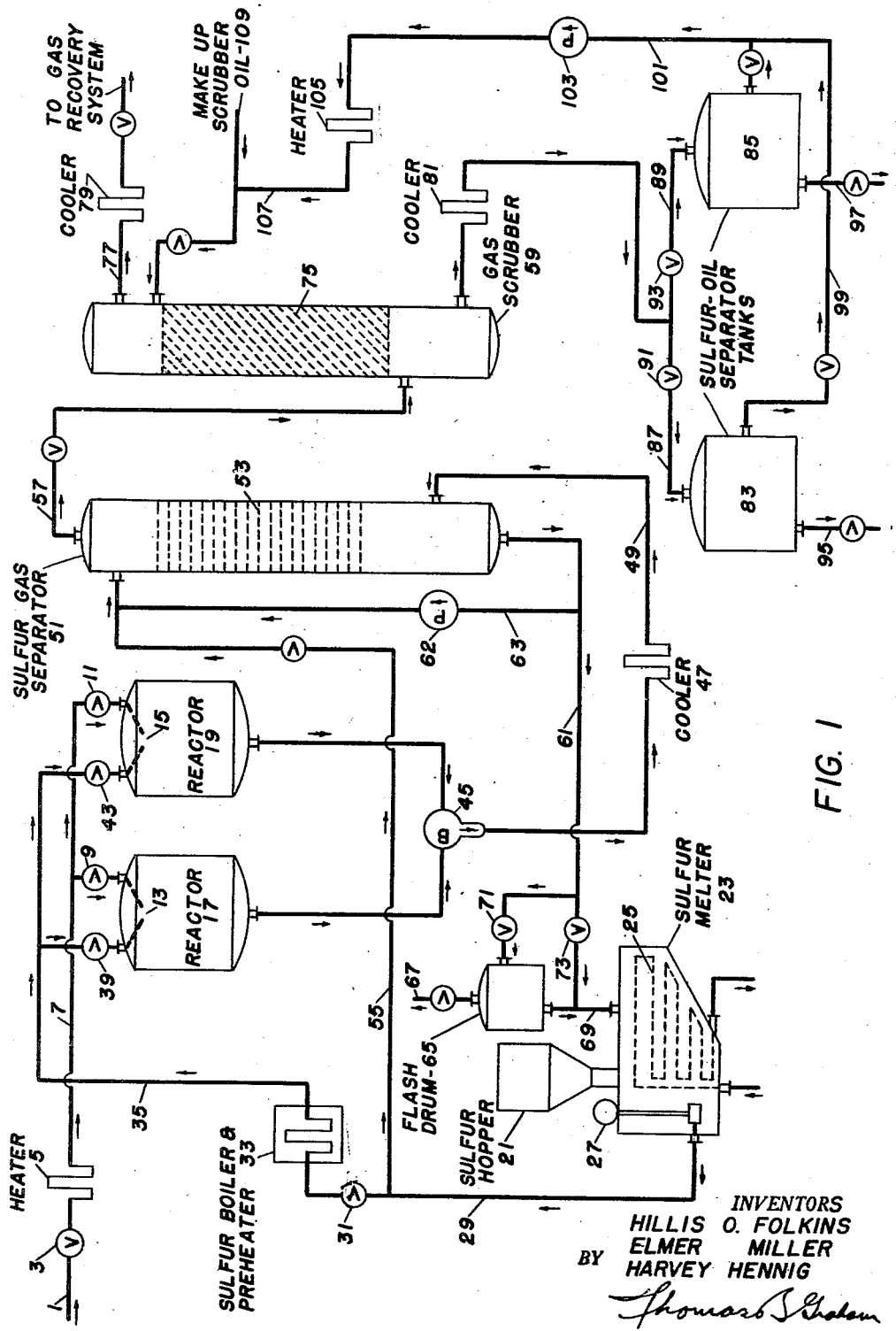

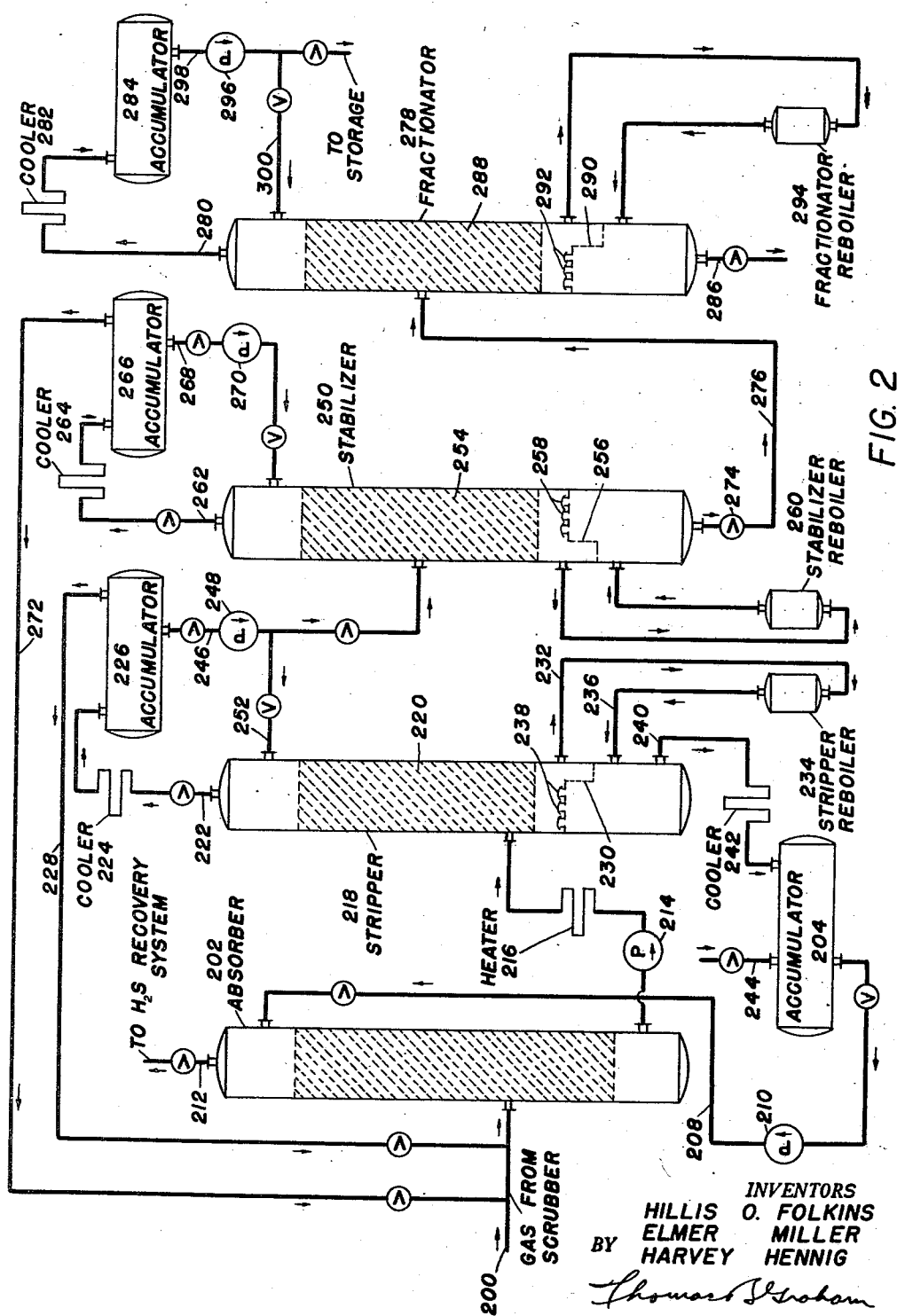

2,661,267

UNITED STATES PATENT OFFICE 2,661,267

PROCESS FOR THE PRODUCTION OF
CARBON DISULFIDE

Hillis O. Folkins, Skokie, and Elmer Miller and Harvey Hennig, Evanston, Ill., assignors, by mesne assignments, to Food Machinery and Chemical Corporation, New York, N. Y., a corporation of Delaware Application August 30, 1948, Serial No. 46,906

7 Claims. (Cl. 23—206)

This invention relates to a process for converting hydrocarbons into sulfur-containing compounds and more particularly the invention relates to an improved method for converting natural or manufactured gases containing substantial amounts of hydrocarbons heavier than methane or heavier hydrocarbons such as propane or butane into carbon disulfide by contact with sulfur vapors under catalytic conditions.

United States Patent No. 2,330,934 discloses a method for the production of sulfur compounds from hydrocarbons by contacting a mixture of hydrocarbon gas and sulfur vapors at elevated temperatures with a catalyst such as silica gel, bauxite, activated alumina or catalytic clays. Our experience has shown that in the operation of the process where hydrocarbon feed gases are used which contain substantial amounts of higher molecular weight hydrocarbons such as propane, butane, pentane, hexane and their corresponding olefinic or diolefinic homologues, there exist certain side reactions which result in catalyst contamination and decline in catalytic activity. These side reactions are the results of and consist of possible cracking of the heavier components of the hydrocarbon feed gas, especially in the presence of sulfur and/or of the reaction or polymerization, with sulfur, of these heavier hydrocarbons or hydrocarbon products under those temperature conditions which are required for high conversions to carbon disulfide of the lower molecular weight hydrocarbon components.

Among the troublesome by-products formed are also high molecular weight sulfur-containing polymers of tar-like consistency which tend to clog equipment and contaminate both the catalyst and the recycle sulfur necessitating frequent and difficultly controlled regeneration and purification operations. Under certain conditions of operation and at certain points within the equipment there may be a degradation of these troublesome polymers into coke-like materials which add to the difficulties and hazards of operation.

It is an object of this invention to provide a more efficient method for converting hydrocarbons into organic sulfur compounds.

It is another object of this invention to increase the efficiency and per cent conversion of processes devoted to the production of carbon disulfide from natural and manufactured hydrocarbon gases.

It is a further object of this invention to provide a mode of operation whereby the formation of troublesome by-products is reduced to a minimum in the synthesis of carbon disulfide from sulfur and hydrocarbons.

It is still another object of this invention to provide a more efficient process for the conversion of hydrocarbons to organic sulfur compounds in which the catalyst life and efficiency are substantially increased and maintained at that level of activity throughout the conversion which gives maximum yields of carbon disulfide per pass.

It is a further object of this invention to provide effective means of improving the conversion of sulfur to carbon disulfide and eliminating the difficulties of sulfur recovery during such process.

It is a further object of this invention to react hydrocarbons heavier than methane, such as propane or butane, or mixtures thereof with sulfur vapors in the presence of a catalyst to form carbon disulfide and to reduce side reactions to a minimum during such conversion.

We have discovered that the reaction between sulfur vapors and hydrocarbon molecules in the presence of catalysts at elevated temperatures is an extremely sensitive one, especially when a natural or manufactured gas containing substantial amounts of hydrocarbons heavier than methane or when hydrocarbons heavier than methane are used as the hydrocargon feed stock. In addition, we have found that under a given set of conditions of time, temperature, pressure and catalyst type there are at least two more factors which have an extreme effect upon the reaction efficiency. These factors are: (1) the conditions of preheating of the hydrocarbon feed prior to charging it to the catalyst chamber, that is, whether or not there has been any cracking of the hydrocarbons prior to contact with sulfur vapors, and (2) the presence or absence of sulfur vapors in the preheated hydrocarbon feed prior to contact with the catalyst.

Our invention thus comprises the application of close supervision of conditions of mixture, preheating and injection of reactants such that there is accomplished a substantial reduction in side reactions.

We have discovered that the preheating of a hydrocarbon gas containing or consisting of higher molecular weight hydrocarbons under conditions which result in cracking of any substantial amount of the hydrocarbons and admixture of sulfur vapors with the preheated hydrocarbon gas prior to contact with the catalyst leads to excessive coke and tar formation and rapid declination of catalyst activity and efficiency. We have also discovered that those conditions of time and temperature which are most effective in promoting carbon disulfide formation from hydrocarbon gas containing substantial amounts of higher molecular weight hydrocarbons and sulfur vapors in the presence of a catalyst are the very conditions under which cracking, polymerization and sulfur-complex tar and coke formation are most prevalent in the absence of a catalyst. We propose to bring the separately preheated hydrocarbon gas, containing substantial amounts of higher molecular weight hydrocarbons and preheated to a temperature just under or over substantial cracking into a reaction zone where it is subjected to cracking conditions, yet, being in the presence of sulfur and catalyst, the hydrocarbon gas is converted to carbon disulfide with substantially no tar or coke formation. It will become apparent from the following description that our invention is directed to means for (1) preventing the mixture of preheated hydrocarbon gas and sulfur from reacting prior to contact with the catalyst, (2) passing the hydrocarbon gases out of the preheater stage and into the $CS_2$ forming reaction stage in contact with sulfur vapors before the hydrocarbon gases have begun to crack, and (3) preventing the hydrocarbon gases and sulfur vapors from reacting, polymerizing, cracking, or entering into inefficient carbon disulfide formation at any time during the preheat, admixture, or catalyst contact stages, and (4) conducting the catalytic reaction between hydrocarbon gases and sulfur under conditions in which the hydrocarbon would crack if it were not for the presence of the sulfur vapors and catalyst, which promote carbon disulfide formation in lieu of cracking and polymerization.

Our invention thus avoids admixture of the reactants until a point adjacent to contact with or until actual contact with the catalyst. This is based on the finding that sulfur tends to catalyze the cracking and/or polymerization of preheated hydrocarbons not in contact with the carbon disulfide-forming catalyst, and which are at or near cracking temperature.

It is known in the art to preheat the hydrocarbon and sulfur reactants prior to contact with the catalyst in the production of carbon disulfide. Our process is distinguishable therefrom in that the hydrocarbon gases are preheated under conditions of time and temperature at which substantially no cracking occurs and mixed directly in the catalyst chamber or at a point contiguous to the catalyst in order that sulfur vapors and the hydrocarbon feed remain unmixed in their preheated condition until they are in contact with or are about to contact the catalyst. Side reactions are thereby reduced to a minimum and the overall efficiency of the process is increased.

The invention will more readily be understood from the following description and accompanying drawing of which:

Figure 1 is a diagrammatic elevational view of the heater, reactors and sulfur recovery system of the apparatus which may be used in carrying out the invention; and Figure 2 is a diagrammatical elevational view of the product recovery system of the apparatus.

Referring now to Figure 1, the number 1 represents a line controlled by valve 3 for introducing charge hydrocarbon gas to the process. The gas charged under pressure through line 1 may be any natural or refinery gas or manufactured gas, preferably having a relatively high methane content. Most gases used have a substantial percentage of $C_2$, $C_3$ and higher hydrocarbons as a part of their composition, and one embodiment of our invention is to successfully and efficiently produce carbon disulfide from such a gas. If desired, the charge gas may be stripped of a large portion of its high molecular weight constituents by absorption, refrigeration or a combination thereof, before charging it to the process. Hydrocarbon charges of higher molecular weight such as one comprised mainly of propane may be used also. The charge gas enters the gas heater 5. The gas heater 5 may be a heating coil or other heat transfer arrangement capable of heating the charge gas to a temperature of from 500° to 1300° F.

It is essential for the successful completion of the preheating operation that the residence time be adjusted so that there is no substantial cracking of the $C_3$ and higher hydrocarbons as they pass through the preheater 5. Pure n-butane shows about 2 per cent cracking at 1112° F. and atmospheric pressure when the residence time is approximately one second. The limits of residence time which have proven operable for the various gas charges contemplated in our process are between approximately 0.1 to 2 seconds. The correlation of temperature and residence time through the preheater 5 will be dependent upon the gas composition. The greater the residence time the more likely the $C_3$ and higher hydrocarbons are to crack, consequently, temperature gradients are desirable. The preheated gases leave the preheater 5 and pass through line 7 via valves 9 and 11 to injection points 13 and 15 within the reactors 17 and 19, respectively, to join the sulfur vapors in the presence of the catalyst. Any standard design of reactor may be used which allows the entrance of two or more reactants at points adjacent to the catalyst bed or allows entrance of reactants with simultaneous admixture and catalyst contact. It is to be understood that in the operation of our process the reactant hydrocarbon gases may be preheated to temperatures above cracking but with residence time adjusted to that time at which substantially no actual cracking takes place. Thus, when using a preheat temperature of over 1100° F. and as high as 1300° F., a gas containing 90 mole per cent $C_3$ hydrocarbons is prevented from cracking by conducting the preheating at very short residence periods of the gas in the preheater.

Solid sulfur, preferably in powdered form, is fed from sulfur hopper 21 to sulfur melter 23. The sulfur melter is heated by means of a steam coil 25 which maintains the sulfur at a temperature between approximately 250°–300° F., and preferably about 270° F. Those temperatures should be avoided at which viscous sulfur forms. The molten sulfur is pumped from the melter 23 by means of sulfur pump 27 through line 29 and valve 31 to sulfur boiler and preheater 33. The sulfur pump may be the submerged type or any suitable pump for propelling molten sulfur under a pressure of approximately 20–100 pounds per square inch.

The pressure under which the molten sulfur is pumped will depend on the operating pressure of the entire system and the design of equipment used. All parts which come in contact with vaporized sulfur with or without the admixture of hydrocarbons must be constructed of alloy or other materials having high resistance to sulfur corrosion. An alloy comprising 16 to 18 per cent chromium, 10 to 14 per cent nickel, 2 to 3 per cent molybdenum, 2 per cent maximum manganese, 0.1 per cent maximum carbon and the balance iron has been found sufficiently resistant to sulfur corrosion to be economical in commercial application to our process. Sulfur boils at 832.3° F. at atmospheric pressure; for this reason in sulfur boiler and preheater 33 the sulfur must be heated to a temperature of at least 833° F. or sufficient to vaporize it at the operational pressures. Temperatures attained by the sulfur in the sulfur boiler and preheater 33 will be approximately 850°–1300° F., and preferably about 1162° F., after which the sulfur vapors leave through line 35 to pass to the reactors 17 and 19 controlled by valves 39 and 43.

When operating the reactors adiabatically, it is preferred to superheat the sulfur vapor sufficiently above the desired reaction temperature to compensate for the decrease in temperature occasioned by the subsequent admixture of sulfur vapors and charge hydrocarbon gas and the reaction which occurs within the reactors. Ordinarily superheating the sulfur vapor to a temperature of from 25° to 75° F. above reaction temperature is sufficient. However, where the hydrocarbon feed is preheated to a temperature below reaction temperature in order to avoid cracking of the gas, it will be necessary to heat the sulfur to a higher temperature necessary to bring the gas-sulfur vapor mixture to desired reaction temperature. When conducting the reaction isothermally, additional heat can be supplied to the reactors to maintain desired reaction temperature, and, therefore, lower superheating temperatures for the sulfur and/or gas can be used. For example, where the reaction is conducted adiabatically at 1112° F. and under about 40 pounds gauge pressure, the gas and sulfur vapor should be superheated to approximately 1162° F. in order to maintain an average temperature of about 1112° F. in the reaction zone. If the reaction is carried out isothermally, superheating may be approximately the same temperature of reaction, namely, 1112° F.

The reactors 17 and 19 comprise the ordinary tube or drum type reactor with means provided to apply external heat thereto if desired. When it is desired to operate the process isothermally, the reactors are heated sufficiently to maintain the temperature of the reactants and prevent any substantial temperature drops at any points within the reactors. The process may be operated adiabatically, in which case the reactors must be properly insulated against any heat losses and may be lined with a material resistant to the attack of sulfur vapors and sulfur compounds. It is desirable also to construct those metal parts of the reactor that come in contact with corrosive sulfur and sulfur vapor compounds with a corrosion resistant alloy. Silica gel, activated alumina, catalytic clay, or natural or synthetic silica-alumina compositions, particularly synthetic silica-alumina catalysts containing a small per cent of silica, are suitable for the operation of our process. Fuller's earth or catalysts which are effective in the removal of color producing and gum forming constituents in petroleum oils may be used. These catalytic compositions may be used either alone or together with one or more compounds of metals of groups V, VI, VII, and VIII of the periodic table. As catalyst promoters there may be used the oxides and sulfides of metals of groups V, VI, VII and VIII of the periodic table. Examples of such promoters are the oxides or sulfides of iron, vanadium, chromium, molybdenum and manganese.

When isothermal operation is contemplated, the reactor is maintained at a temperature of 950° to 1300° F., and preferably 1000° to 1150° F. Our experiments have shown that where adiabatic operation is maintained, the preferred method is to charge the reactants to the reactor at a sufficiently high temperature above the average reaction temperature to compensate for any drop in temperature that will occur. An example of such an operation would be maintaining the entrance temperature of reactants at approximately 1145° F. and at 20–60 pounds per square inch gauge to overcome a temperature drop of 35° to 70° F. which is generally experienced, in order to support an average temperature through the catalyst bed of approximately 1112° F. The amount of catalyst and the size of the reactors are dependent on the percentage conversion per pass and the production capacity. Ordinarily, a space velocity based on hydrocarbon charge of from 100–400 cubic feet of gas measured at 32° F. and 760 millimeters of mercury passing over a unit volume of catalyst per hour will result in good conversion.

The amount of sulfur charged to the reactor will vary and obviously the rate of charge will depend on the volume of the reactor and the rate of charge of hydrocarbon feed vapors. It is ordinarily desirable to use amounts of sulfur equal to or in excess of that required for stoichiometric reaction with the above mentioned volumes of gas. We prefer to use an amount of sulfur equal to about 10 to 50 per cent by weight in excess of the stoichiometric requirements to react with the hydrocarbon vapors to form carbon disulfide and hydrogen sulfide. The excess sulfur at reaction temperatures tends to overcome the temperature drop during reaction. In addition, excess sulfur causes more complete reaction of the hydrocarbons and obviates the necessity of separating the hydrocarbon from the hydrogen sulfide prior to recovery of sulfur from the hydrogen sulfide.

The preferred pressure in reactors 17 and 19 will be approximately 20 to 60 pounds per square inch gauge. For economy those pressures are used which will force the reaction products through the remainder of the apparatus without additional compressor equipment, as it is preferred to operate the recovery absorber under pressure.

An alternative procedure would be to carry out the reaction at pressures below 20 pounds per square inch. Lower pressures tend to decrease temperature drop across the catalyst bed, especially when operating adiabatically in the lower part of the temperature range. This would necessitate the use of a compressor to augment pressures in the gas recovery system.

The hydrocarbon vapors and sulfur react to form carbon disulfide and hydrogen sulfide in reactors 17 and 19, which products pass through a waste heat boiler 45. In waste heat boiler 45 the gases pass in indirect heat exchange with water and/or steam in order to convert the water to high pressure steam for use in the reboilers and for extraneous use if necessary. The effluent total reaction products leave the waste heat boiler 45 at a temperature of approximately 450° to 500° F., pass through water cooler 47 where the temperature of the reaction products is reduced to approximately 250° to 300° F., and preferably about 270° F., and the products then proceed via line 49 to the bottom of sulfur-gas separator 51. Finned radiator tubes and/or conventional water coolers may be used in place of the waste heat boiler 45 and water cooler 47. The sulfur-gas separator 51 will ordinarily contain a series of bubble plates 53 or other suitable contact means which give efficient contact between the rising gases and the descending liquid sulfur supported by the plates. Molten sulfur is forced by centrifugal sulfur pump 27 through line 55 to the top of separator 51. The major portion of the unreacted and excess sulfur in the reaction product effluent is condensed in the bottom of separator 51. Most of the sulfur dust contained in the reaction gases is condensed and absorbed by the downward flowing liquid sulfur as the gases rise through the tower. Carbon disulfide and hydrogen sulfide, together with any unreacted hydrocarbon gas, leave the top of the separator 51 through line 57 and pass to the lower portion of a gas scrubber 59. Effluent molten sulfur from the separator 51 is recirculated back to the sulfur melter 23 via line 61. A portion or all of the effluent molten sulfur from the separator may be recycled through the separator by pump 62 through line 63. Ordinarily, as we have previously specified, the pressure in the gas separator 51 is sufficient to force the molten sulfur back to the sulfur melter 23 without supplying additional pumping equipment. The danger of fire hazard is overcome by returning the recycle sulfur to flash drum 65 which is maintained at atmospheric pressure to allow any carbon disulfide to distill off. The thus separated carbon disulfide may be conducted through line 67 for recovery or permitted to escape in the atmosphere. Line 69 provides a return conduit from the flash drum to the sulfur melter. Valves 71 and 73 are provided to permit the diversion of the recycle sulfur either to the sulfur melter 23 or to the flash drum 65. In gas scrubber 59 the reaction products which are relatively free from the bulk of sulfur dust pass upwardly in countercurrent contact with a downwardly flowing stream of scrubber oil. This contacting process removes the remaining sulfur dust from the reaction products. The scrubber oil may comprise light gas oil or a lube oil fraction. Raschig rings 75 or other suitable contacting means are provided in gas scrubber 59. The pressure and temperature of the gas scrubber are interdependent on the conditions of operation used in the reactors 17 and 19 and the gas separator 51. The sulfur-free reaction products are withdrawn from the top of gas scrubber 59 through line 77 and pass through cooler 79 to gas recovery system, to be described. The reaction products leaving cooler 79 are at a temperature of approximately 100° F.

Scrubber oil leaving the bottom of gas scrubber 59 passes through water cooler 81 where the temperature is reduced to 100° F. or less and then passes to settling drums 83 and 85 through lines 87 and 89 controlled by valves 91 and 93. Two settling tanks are provided in order that the sulfur which has crystallized from the oil at 100° F. during the period of operation may be allowed to settle more completely from the oil in one tank, and may be withdrawn (together with the oil if desired) from this tank, while the oil circulation is being maintained in the gas scrubber and other settling tank, thus facilitating continuous operation of the gas scrubber system. The cooled separated sulfur is withdrawn at appropriate times as a sludge from lines 95 and 97, or is removed by mechanical means after the oil has been withdrawn. Scrubber oil is recirculated via lines 99 and 101 by scrubber pump 103, through heater 105 where it is heated to 250°–300° F. for return by line 107 to top of gas scrubber 59. Make-up scrubber oil may be added through line 109 as required.

The scrubber oil may be recycled indefinitely or withdrawn and burned or used to make high sulfur cutting oils. Filters or centrifuges may be provided to separate the sulfur from the oil instead of the settling tanks. Cooled reaction products after leaving the gas scrubber 59 pass to the product recovery system, which will be described in Figure 2, where the carbon disulfide and hydrogen sulfide are separated.

Referring to Figure 2, reaction products after leaving the gas scrubber, and after having been cooled to 100° F. or less, enter through line 200 into the lower portion of an absorber 202. The absorber is fitted with Raschig rings or other liquid-gas contacting elements. Absorber 202 is preferably maintained at a pressure of approximately 20 to 50 pounds per square inch gauge in order to absorb carbon disulfide from the reaction products gases. Lean oil is pumped into the top of the absorber from accumulator 204 through line 206 by means of pump 210. As absorber oil, heptane or petroleum naphtha having a boiling range of about 250°–400° F. or other fraction boiling above the boiling point of carbon disulfide may be used. Other solvents or absorbing mediums such as benzene and o-dichlorobenzene may be used. It is preferable to choose an absorber oil which has a boiling point or boiling range not too far above the boiling point of carbon disulfide in order to enable the latter to be readily stripped therefrom. However, heavier absorption oils may be used and stripping carried out with the aid of a stripping medium such as steam, methane or other inert gas. The unabsorbed gas leaves the top of the absorber through line 212. This gas is composed of hydrogen sulfide with a small amount of hydrocarbon gas and about 0.5 per cent or less of carbon disulfide. This gas may be charged to a hydrogen sulfide recovery system wherein the hydrogen sulfide is converted to sulfur, or the gas may be used in the manufacture of other chemicals such as sodium sulfide, sodium hydrosulfide, zinc sulfide and sulfuric acid. The rich oil is withdrawn from the bottom of absorber 202 by means of pump 214, passed through steam heater 216 where the rich oil is preheated to a suitable temperature, as, for example, 200°–350° F., and charged to the middle section of stripper 218. Stripper 218 is provided with Raschig rings 220 or other liquid-gas contact elements. Carbon disulfide is stripped from the absorber oil and passes from the top of the stripper through line 222, water cooler or condenser 224, where the temperature is reduced to 100° F., or less, to accumulator 226. Any gas and/or vapor which remains uncondensed leaves the accumulator 226 through line 228 and is returned to the inlet of the absorber 202 through line 200. The stripper 218 is preferably operated at a pressure slightly above the pressure in the absorber 202, as, for example, 25 to 55 pounds per square inch gauge, in order to avoid the necessity of compressing the gas returned through line 228 to the scrubber.

The absorber oil is withdrawn from the plate 230 in the bottom portion of stripper 218 through line 232 and charged to reboiler 234 and thence returned through line 236 to the section of the stripper below the plate 230. Plate 230 is provided with vapor uptakes 238. Lean absorber oil is withdrawn from the bottom of stripper 218 through line 240, cooled in water cooler 242 to a temperature below 100° F., and returned to accumulator 204. It will be apparent that the rich oil from absorber 202 can be used to partially cool the lean oil from stripper 218 by providing a suitable heat exchanger. Fresh absorber liquid is added to accumulator 204 as required through line 244.

Liquid carbon disulfide is withdrawn from accumulator 226 through line 246 and charged by means of pump 248 to stabilizer 250. A portion of the carbon disulfide may be pumped through line 252 to the upper portion of stripper 218 as reflux. The stabilizer 250 is operated at pressures of 20 pounds per square inch gauge or above, and preferably in the ranges of 50-150 pounds. The temperature in the bottom of the stabilizer is that needed to effectively boil the carbon disulfide and free it of hydrogen sulfide and hydrocarbon gas under the conditions of operation. The stabilizer 250 is equipped with contact surfaces 254, such as Raschig rings, with a plate 256 having vapor uptakes 258 and a reboiler 260. In the stabilizer 250, any hydrogen sulfide or hydrocarbon gas absorbed in the carbon disulfide is boiled off and passes overhead through line 262 through water cooler 264. A small amount of carbon disulfide passes overhead, is condensed in part in cooler 264, and collected in accumulator 266. The condensate from accumulator 266 is returned to the top of the stabilizer through line 268 by means of pump 270. The uncondensed gases and vapors are withdrawn from the accumulator 266 through line 272 and recycled to the inlet of absorber 202 through line 200. The bottoms from the stabilizer 250 are withdrawn through a pressure control valve 274 and charged through line 276 with the necessary heating or cooling, to the middle portion of fractionating column 278 from which the carbon disulfide is taken overhead through line 280, condensed in water cooler 282 and collected in accumulator 284 as finished product. Any bottoms, such as absorption oil, which may have passed overhead with the carbon disulfide from stripper 218 are withdrawn from the bottom of the fractionator 278 through line 286. Fractionator 278 is equipped with contact surfaces 288 such as Raschig rings, a separator plate 290 having vapor uptakes 292 and a reboiler 294. Fractionator 278 is preferably operated at atmospheric pressure. The finished carbon disulfide is withdrawn from the accumulator 284 by means of pump 296 through line 298 to storage. A portion of the carbon disulfide may be recirculated through line 300 as reflux to the top of the fractionator 278.

It will be understood that the process is not limited to the flow described and the apparatus shown in the recovery system. Variations in both flow and equipment can be made to suit particular conditions of operation. For example, when operating under pressure, a portion of the carbon disulfide will condense in cooler 79 (Figure 1). It might be expedient, therefore, when operating under pressure to provide an accumulator to which the products leaving cooler 79 could be sent in order to separate the condensed carbon disulfide and then charge it directly to the stabilizer 250.

Likewise, by equipping absorber 202 with a reboiler so that hydrogen sulfide and methane can be completely removed from the liquid, the stabilizer 250 can be dispensed with.

It will be apparent to those skilled in the art that the various pieces of equipment are shown diagrammatically. The invention is not limited to the use of any particular type of equipment. For example, although once-through reboilers have been shown, kettle-type reboilers may be used in place thereof. Moreover, strippers may be used which employ live steam as stripping medium. Such other variants as are within the skill of the art are implicit within the disclosure.

For those skilled in the art it is understandable that the various pieces of equipment are not operable as such and that additional controls, gauges and accessory equipment must be supplied in the construction of a commercial scale plant. Those variations which one skilled in the art would pre-suppose as operable to our process are contemplated as a part of our specification.

Following are examples which will explain the invention and point out its improvements.

*Example 1.*—Technical propane containing 95 mole per cent propane, 2 mole per cent ethane and 3 mole per cent butanes and heavier hydrocarbons is preheated to a temperature of 1050° F. having a residence time in the preheater of around 0.4 second and injected into a reaction chamber maintained at 1112° F. and atmospheric pressure; simultaneously sulfur vapors at 1145° F. are injected separately into the reaction chamber. The two reactants are passed over an activated alumina catalyst at a space velocity of 850 for a period of 1 hour. An excess of 50 per cent of stoichiometric requirements of sulfur is used over that required to form carbon disulfide and hydrogen sulfide from the carbon content of the gas. A yield of 89 per cent carbon disulfide is obtained with no tar or coke formation during the entire reaction period.

*Example 2.*—Technical propane containing 95 mole per cent propane, 2 mole per cent ethane and 3 mole per cent butanes and heavier hydrocarbons is preheated to a temperature of 1100° F. and admixed with 25 per cent excess sulfur vapors at 1145° F. prior to entry into contact with the catalyst consisting of synthetic alumina containing about 5 per cent of silica. The mixture is allowed to be in contact for 1 minute at 1130° F. prior to contact with the catalyst. The mixture is then passed at a total space velocity of 725 over the catalyst at 1112° F. and atmospheric pressure with an 18° F. drop in overall temperature. A yield of only 75 per cent carbon disulfide is obtained in a reaction time of 2 hours. The line leading from the reactor to the waste heat boiler is found to be practically clogged with tar and coke.

*Example 3.*—Technical propane, as in Example 2, is preheated to 1112° F. with residence time of 0.09 to 1.5 seconds in the preheater and injected immediately into a reaction zone containing synthetic alumina with 5 per cent silica which is being flooded or is in contact with sulfur vapors at 1115° F. Reaction residence time is maintained at 3.0 to 5.0 seconds and a yield of 88 per cent carbon disulfide is obtained with substantially no tar or coke formation after a run of 5 hours It will be seen, therefore, that we have devised an efficient process for synthesizing carbon disulfide from higher molecular weight hydrocarbon gases and sulfur by separately preheating the gas and sulfur vapor, controlling the conditions of preheat for the hydrocarbon gas to prevent cracking thereof prior to contact with the catalyst and avoiding admixture of the preheated gas and sulfur vapors until the heated gas and sulfur vapors are about to contact the catalyst or are in contact therewith. By proceeding in this manner, cracking and polymerization of the gas and the undesirable reaction with sulfur with resulting clogging and destruction of the catalyst is avoided. By preventing reaction of the gas before it reaches the catalyst bed, conversion of the gas to carbon disulfide in preference to hydrocarbon polymers and undesirable sulfur compounds takes place.

The above examples have illustrated substantial reduction of tar and coke formation by the application of our invention. However it is to be understood to make our process completely operative we have shown two reactors (17 and 19) in Figure 1 because, after prolonged use, the catalyst must be removed and replaced or regenerated and during such operation the second reactor can be producing carbon disulfide, thus making the process continuous.

What is claimed is:

1. The process for producing carbon disulfide by reaction of hydrocarbon gases containing a substantial amount of $C_3$ and higher hydrocarbons and sulfur at about 1112° F. in the presence of a catalyst capable of promoting carbon disulfide formation, which comprises separately preheating said hydrocarbon gases to reaction temperature, controlling the residence time at said temperature to prevent substantial cracking of said hydrocarbon gas, separately preheating said sulfur to a temperature sufficient so that when mixed with said preheated gas and contacted with catalyst the reaction temperature of the mixture will be about 1112° F., substantially simultaneously mixing said preheated hydrocarbon gas with the preheated sulfur and contacting the mixture with said catalyst, the amount of sulfur being at least the stoichiometric amount necessary to react with the gas to form carbon disulfide, and separating carbon disulfide from the product.

2. The process in accordance with claim 1 in which the residence time of the preheating of said hydrocarbon gas is 0.1 to 2.0 seconds.

3. The process in accordance with claim 1 in which the catalyst is selected from the group consisting of silica gel, activated alumina, bauxite and catalytic clays.

4. The method in accordance with claim 1 in which the hydrocarbon gas is selected from the group consisting of natural gas, refinery gas, propane, butane and pentane.

5. The method in accordance with claim 1 in which the sulfur is present in 20 to 50 per cent excess of that stoichiometrically required to convert all of the carbon content of the hydrocarbon to carbon disulfide.

6. The process for producing carbon disulfide by the reaction of hydrocarbon gas containing substantial amounts of $C_3$ and higher hydrocarbons with sulfur vapors in the presence of a catalyst capable of promoting carbon disulfide formation, the amount of sulfur being at least the stoichiometric amount necessary to react with the gas to form carbon disufide, comprising preheating said hydrocarbon gas to about 1050° F. for a residence time of about 0.4 second, separately preheating said sulfur vapors to about 1145° F., simultaneously mixing said preheated hydrocarbon gas and sulfur vapors and contacting the mixture with said catalyst at about 1112° F. under atmospheric pressure, at a space velocity of about 850 and recovering carbon disulfide from the product.

7. The method in accordance with claim 6 in which the hydrocarbon gas comprises propane containing about 95 mole per cent propane, 2 mole per cent ethane, and 3 mole per cent of butanes and heavier hydrocarbons, and wherein an excess of 10 to 50 per cent of sulfur over the stoichiometric requirements are used for the reaction.

HILLIS O. FOLKINS.
ELMER MILLER.
HARVEY HENNIG.

References Cited in the file of this patent

UNITED STATES PATENTS

| Number | Name | Date |
|---|---|---|
| 2,187,393 | De Simo | Jan. 16, 1940 |
| 2,428,727 | Thacker | Oct. 7, 1947 |